(12) United States Patent
Chen et al.

(10) Patent No.: US 8,570,608 B2
(45) Date of Patent: Oct. 29, 2013

(54) SCANNER, HAS TAB COMPRISING TAB BODY EXTENDING FROM BOTTOM PANEL AND RESILIENT ABSORBING PORTION CONNECTED TO TAB BODY, AND RESILIENT ABSORBING PORTION RESISTING LOADING PANEL TO PREVENT MOVEMENT OF LOADING PANEL

(75) Inventors: Po-Chun Chen, New Taipei (TW); Shi-Ming Ou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 219 days.

(21) Appl. No.: 13/279,959

(22) Filed: Oct. 24, 2011

(65) Prior Publication Data

US 2012/0287478 A1    Nov. 15, 2012

(30) Foreign Application Priority Data

May 9, 2011    (TW) .............................. 100116228 U

(51) Int. Cl.
*H04N 1/21* (2006.01)
*G03G 15/08* (2006.01)
*G06K 9/00* (2006.01)

(52) U.S. Cl.
USPC ........... 358/296; 358/474; 358/497; 399/104; 382/187

(58) Field of Classification Search
None
See application file for complete search history.

(56) References Cited

U.S. PATENT DOCUMENTS

| 5,818,611 | A | * | 10/1998 | Shih .............................. 358/474 |
| 5,917,618 | A | * | 6/1999 | Peng et al. ..................... 358/498 |
| 5,926,290 | A | * | 7/1999 | Chen et al. .................... 358/496 |
| 7,006,265 | B2 | * | 2/2006 | Chiang ......................... 358/497 |
| 7,136,199 | B2 | * | 11/2006 | Cantwell ....................... 358/474 |

* cited by examiner

*Primary Examiner* — Steven Kau
(74) *Attorney, Agent, or Firm* — Altis & Wispro Law Group, Inc.

(57) ABSTRACT

A scanner includes a scanning module and a base. The scanning module includes a loading panel and a driving module. The base includes a bottom panel, a sliding portion, and a first resisting tab extending from the bottom panel. A sliding slot is defined in the sliding portion to receive the scanning module. The first resisting tab includes a first tab body extending from the bottom panel and a first resilient absorbing portion connected to the first tab body. The first resilient absorbing portion resists the loading panel to prevent movement of the loading panel when the loading panel moves to a first side of the sliding slot.

18 Claims, 6 Drawing Sheets

SCANNER, HAS TAB COMPRISING TAB BODY EXTENDING FROM BOTTOM PANEL AND RESILIENT ABSORBING PORTION CONNECTED TO TAB BODY, AND RESILIENT ABSORBING PORTION RESISTING LOADING PANEL TO PREVENT MOVEMENT OF LOADING PANEL

CROSS-REFERENCE TO RELATED APPLICATIONS

This application is related to co-pending U.S. Patent Application entitled "SCANNER", U.S. application Ser. No. 13/278,457 filed on Oct. 21, 2011.

BACKGROUND

1. Technical Field

The disclosure generally relates to scanners, especially, to a scanner with a base for engaging a scanning module of the scanner.

2. Description of Related Art

A scanning module is driven by a motor to move back and forth relative to a base. When the scanning module moves to one side of the base, the scanning module needs to be repositioned and the motor must be stopped. However, the motor may not stop when the scanning module has moved to a side of the base, which makes the scanning module shake and become unstable.

Thus, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
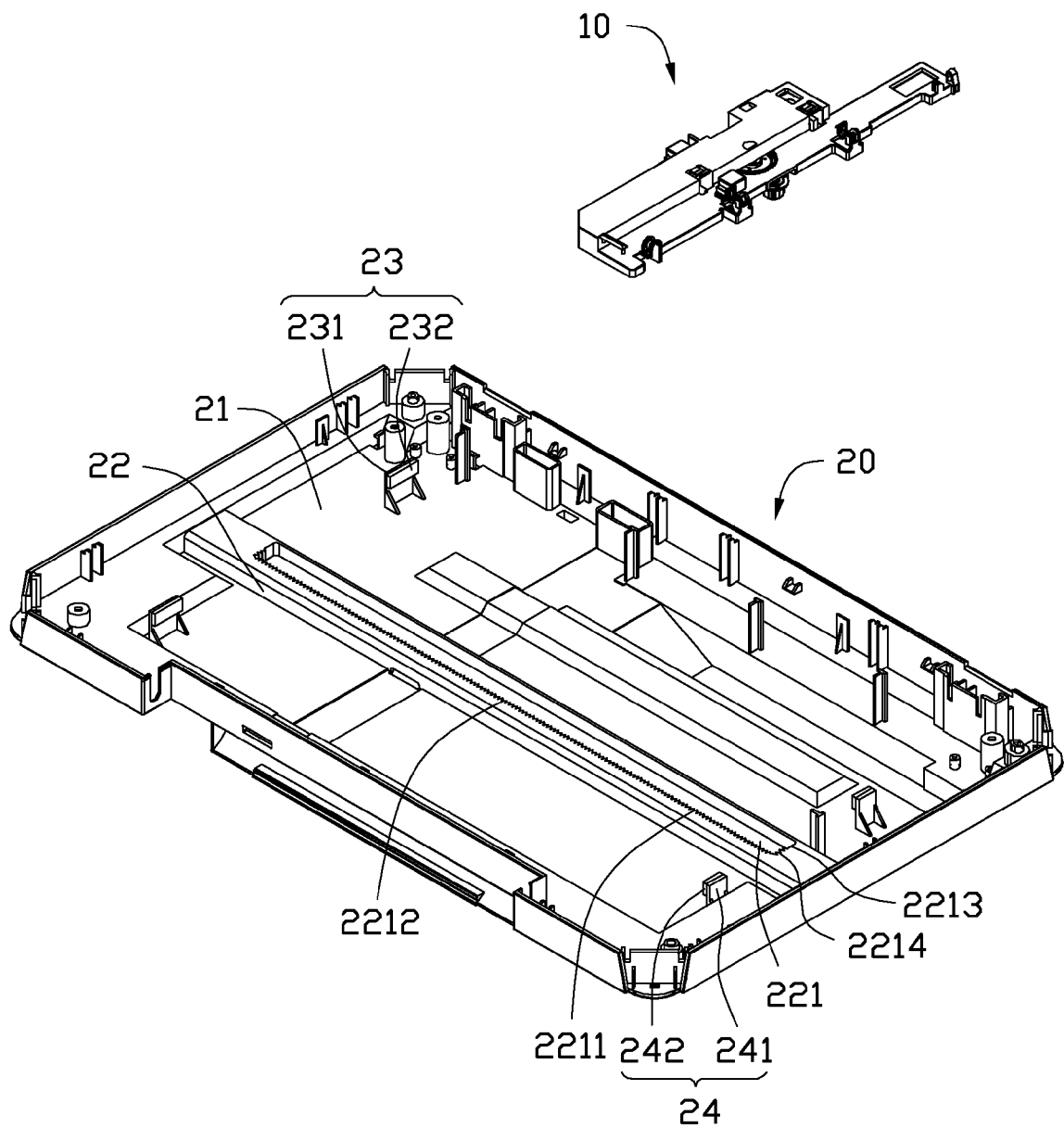
FIG. 1 is an exploded, isometric view of an embodiment of a scanner.
Figure 2:
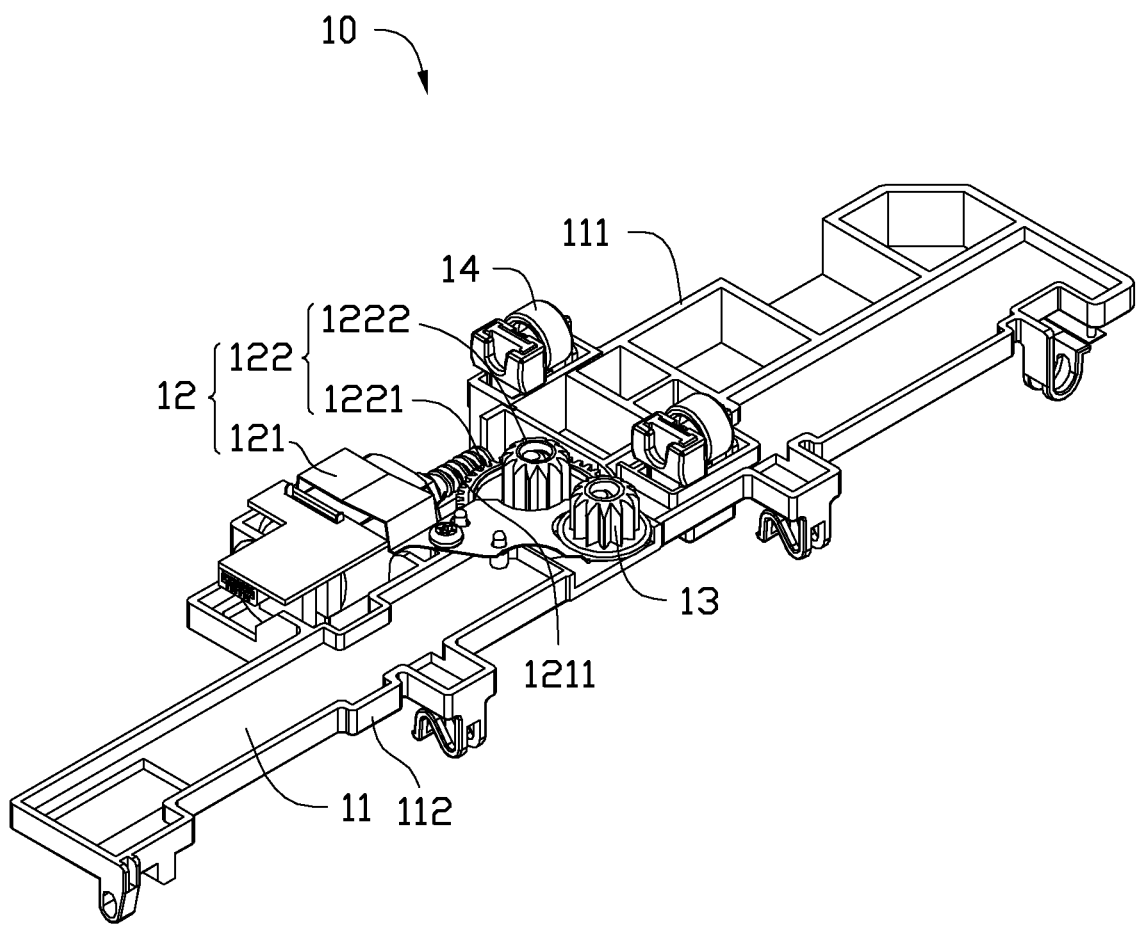
FIG. 2 is an isometric view of the scanning module of FIG. 1.
Figure 3:
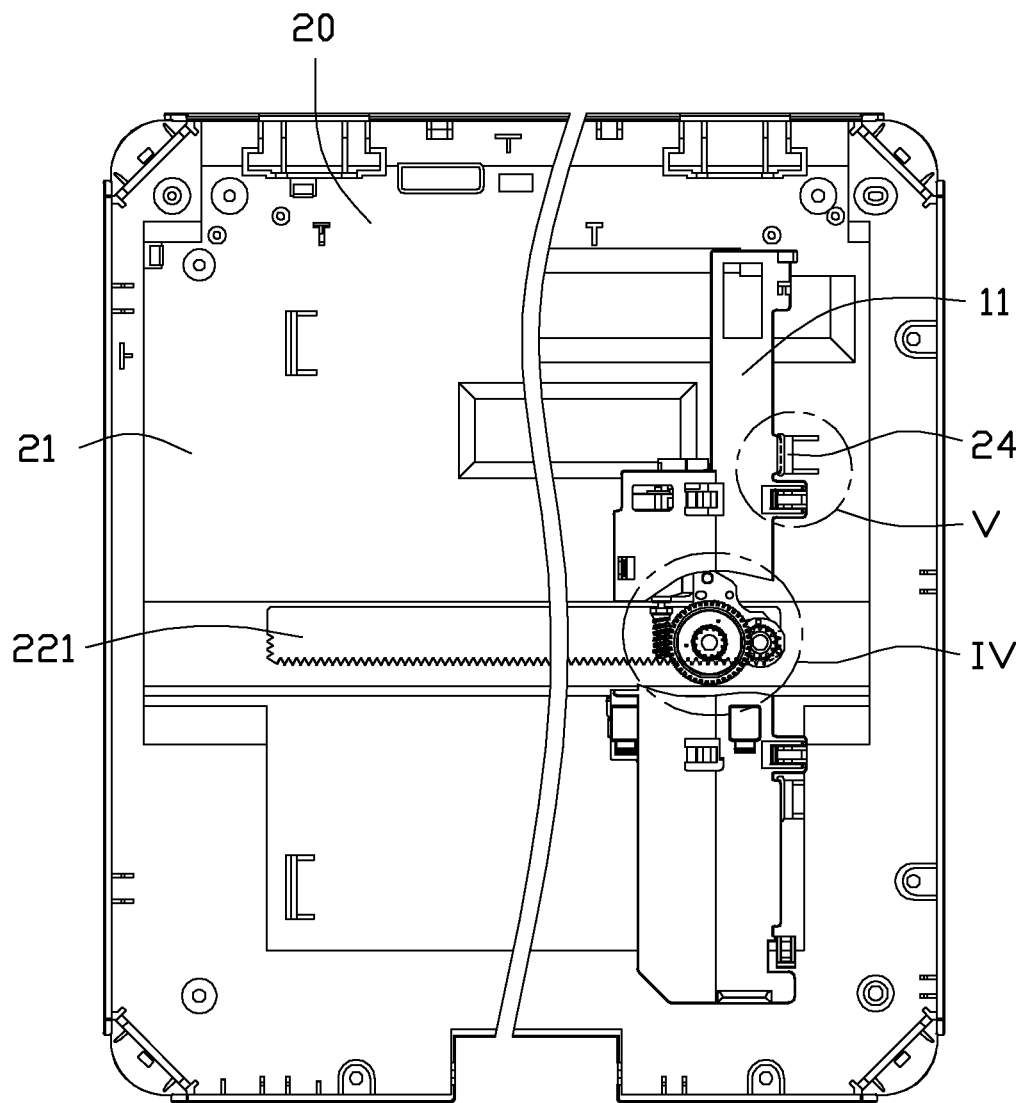
FIG. 3 is a plan view of the device of FIG. 1 when the scanning module has moved to the right hand side of the sliding slot of FIG. 1.
Figure 4:
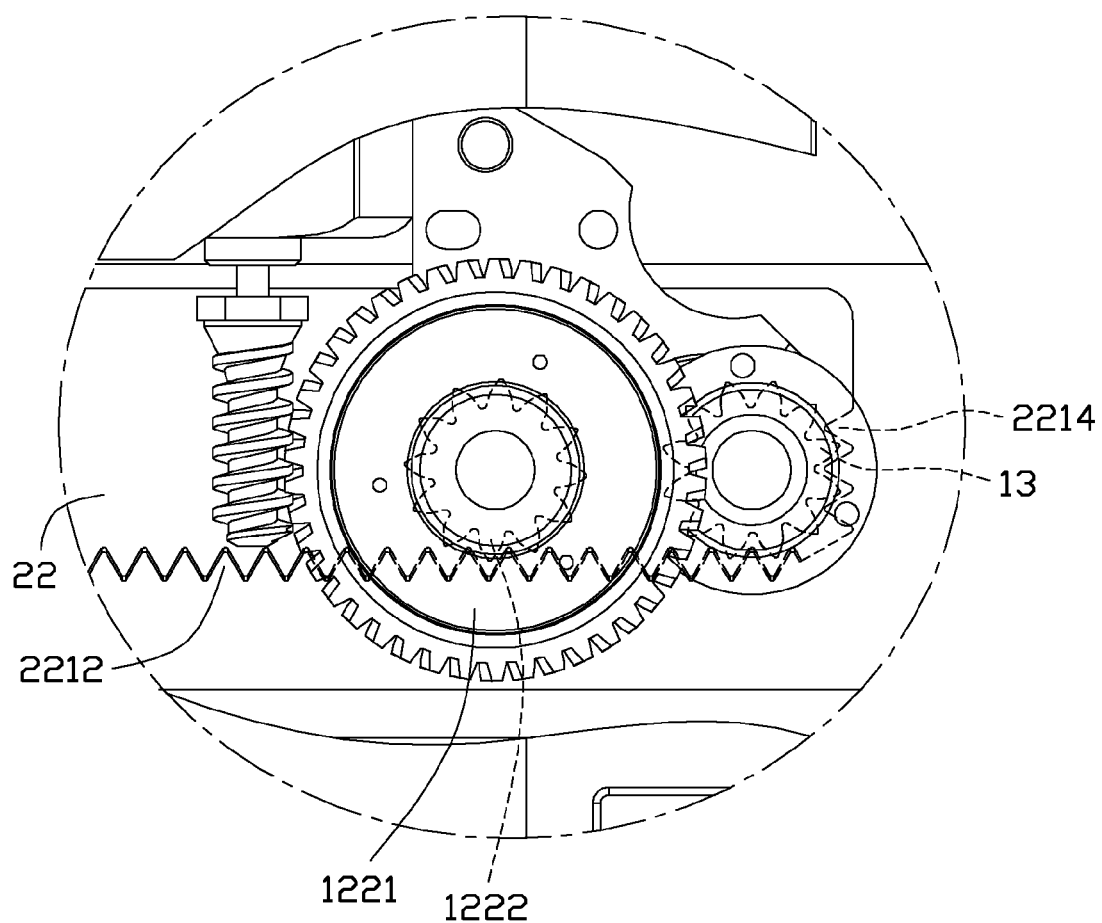
FIG. 4 is an enlarged view of circle IV of FIG. 3.
Figure 5:
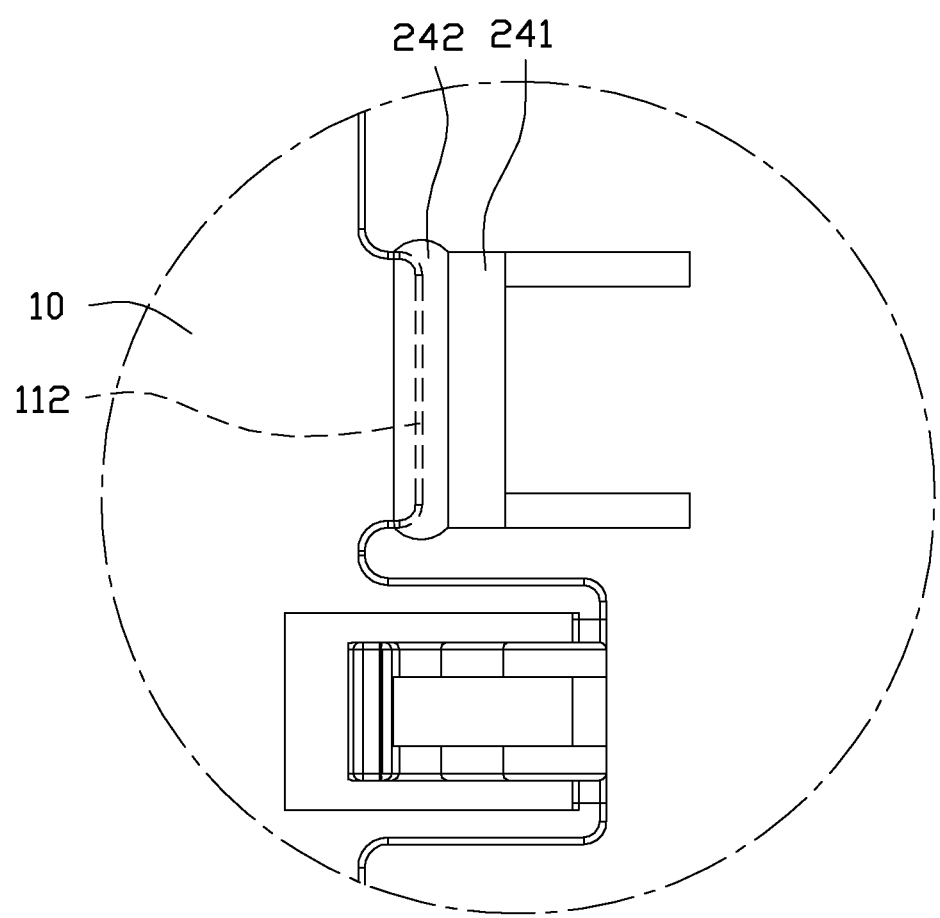
FIG. 5 is an enlarged view of circle V of FIG. 3.
Figure 6:
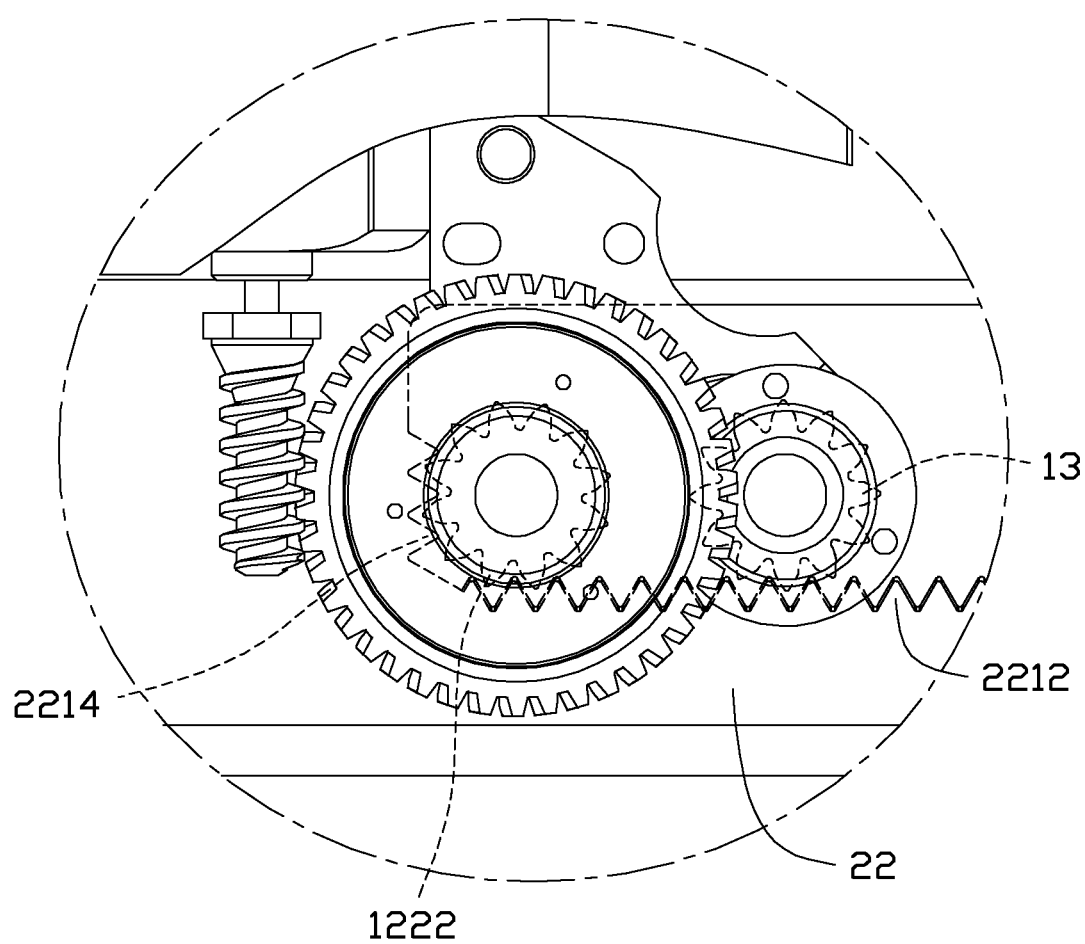
FIG. 6 is an enlarged view of the device of FIG. 1 when the scanning module has moved to the left hand side of the sliding slot of FIG. 1.

Referring to FIGS. 1 and 2, one embodiment of a scanner is shown. The scanner includes a scanning module 10 and a base 20 for mounting the scanning module 10.

The scanning module 10 includes a loading panel 11, a driving module 12, an assistant gear 13, two chain wheels 14 mounted on the loading panel 11, and a sensing module (not shown) mounted on the loading panel 11. In one embodiment, the sensing module is a contact image sensor (CIS) module. The loading panel 11 includes a first side surface 111 and a second side surface 112 substantially parallel to the first side surface 111.

The driving module 12 includes a motor 121 and a worm gear assembly 122. The motor 121 includes a worm 1211. The worm gear assembly 122 includes a worm gear 1221 for engaging the worm 1211 and a slave gear 1222 having the same axis with the worm gear 1221. The assistant gear 13 and the slave gear 1222 are in the same size. The worm 1211 can rotate worm gear 1221. The slave gear 1222 can be driven by the worm gear 1221 to be rotated.

The base 20 includes a bottom panel 21 parallel to the loading panel 11, a sliding portion 22, a first resisting tab 23 and a second resisting tab 24 extending from the bottom panel 21. The first resisting tab 23 and the second resisting tab 24 are both perpendicular to the bottom panel 21. The first side surface 111 is perpendicular to the bottom panel 21. The sliding portion 22 defines a rectangular sliding slot 221. The sliding portion 22 includes an outside surface 223. The sliding slot 221 defines a longer side surface 2211 substantially perpendicular to the loading panel 11 and two shorter side surfaces 2213 extending from the longer side surface 2211 perpendicularly. A plurality of continuous first teeth slots 2212 is defined along the length of the longer side surface 2211 corresponding to the slave gear 1222 and the assistant gear 13. A plurality of continuous second teeth slots 2214 is defined in each shorter side surface 2213. The first resisting tab 23 includes a first tab body 231 and a first resilient absorbing portion 232. The second resisting tab 24 includes a second tab body 241 and a second resilient absorbing portion 242. The sliding portion 22 is below and between the first resisting tab 23 and the second resisting tab 24, such that the resisting tabs 23 and 24 provide side limits to the movement of the scanning module 10.

Referring to FIGS. 3 to 6, in assembly, the slave gear 1222 and the assistant gear 13 of the scanning module 10 are placed in the sliding slot 221 of the base 20 and engage the first teeth slots 2212. At this time, the two chain wheels 14 are adjacent to the outside surface 223 of the sliding portion 22.

The worm 1211 is rotated when the motor 121 of the driving module 12 is working. The slave gear 1222 is driven by the worm gear 1221 to be rotated and thus to move along the longer side surface 2211 of the sliding slot 221. The assistant gear 13 is rotated and moves with the slave gear 1222. At this time, the two chain wheels 14 move along the outerside surface 223. The scanning module 10 moves to one side or the other depending on the direction of rotation of the worm 1211 (clockwise or counter-clockwise). When the scanning module 10 has moved to one side, the slave gear 1222 engages the second teeth slots 2214 of the shorter side surface 2213 to prevent the slave gear 1222 from rotating further. The first resisting tab 23 resists the first side surface 111 of the loading panel 11 to prevent further movement of the scanning module 10, thereby stopping the motor 121 from rotating. The first resilient absorbing portion 232 of the first resisting tab 23 is crushed and deforms, which can also prevent movement of the loading panel 11 along a direction perpendicular to the bottom panel 21. When the scanning module 10 has moved to the other side the assistant gear 13, the second resisting tab 24, and the second resilient absorbing portion 242 perform the same function(s) as their counterparts on the other side.

Although numerous characteristics and advantages have been set forth in the foregoing description of embodiments, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A scanner comprising:
   a scanning module, the scanning module comprising a loading panel and a driving module adapted to drive the loading panel; and
   a base, the base comprising a bottom panel, a sliding portion, and a first resisting tab extending from the bottom panel; a sliding slot defined in the sliding portion to receive the scanning module; the first resisting tab comprising a first tab body extending from the bottom panel and a first resilient absorbing portion connected to the first tab body; and the first resilient absorbing portion adapted to resist the loading panel to prevent movement of the loading panel when the loading panel moves to a first side of the sliding slot.

2. The scanner of claim 1, wherein the base further comprises a second resisting tab extending from the bottom panel; the second resisting tab comprises a second tab body extending from the bottom panel and a second resilient absorbing portion connected to the second tab body, the second tab body is adapted to resist the loading panel to prevent movement of the loading panel when the loading panel moves to a second side of the sliding slot opposite to the first side.

3. The scanner of claim 1, wherein the sliding slot defining a longer side surface and a first shorter side surface extending from the longer side surface, a plurality of first teeth slots defined in the longer side surface and a plurality of second teeth slots defined in the first shorter side surface; the driving module comprises a worm gear assembly engaging the plurality of first teeth slots and capable of moving along the longer side surface; and the worm gear assembly engages the plurality of second teeth slots to prevent the loading panel from moving when the loading panel moves to the first side along the longer side surface.

4. The scanner of claim 3, wherein the scanning module further comprises an assistant gear; the sliding slot further defines a second shorter side surface extending from the longer side surface, a plurality of third teeth slots defined in the second shorter side surface; and the assistant gear engages the plurality of third teeth slots to prevent the scanning module from moving when the scanning module moves to the second side along the longer side surface.

5. The scanner of claim 4, wherein the second shorter side surface is substantially perpendicular to the longer side surface.

6. The scanner of claim 3, wherein the first shorter side surface is substantially perpendicular to the longer side surface.

7. The scanner of claim 6, wherein the scanning module further comprises a chain wheel mounted on the loading panel; the sliding portion includes an outer side surface; and the chain wheel is rotated to move along the outer side surface when the scanning module moves.

8. The scanner of claim 2, wherein the loading panel comprises a first side surface and the first resisting tab is adapted to resist the first side surface when the scanning module moves to the first side of the sliding slot.

9. The scanner of claim 8, wherein the loading panel comprises a second side surface substantially parallel to the first side surface and the second resisting tab is adapted to resist the second side surface when the scanning module moves to the second side of the sliding slot.

10. A scanner comprising
    a scanning module, the scanning module comprising a loading panel and a driving module adapted to drive the loading panel to move; and
    a base, the base comprising a bottom panel substantially parallel to the loading panel, a sliding portion, and a first resisting tab extending from the bottom panel; a sliding slot defined in the sliding portion to receiving the scanning module; the first resisting tab comprising a first tab body extending from the bottom panel and a first resilient absorbing portion connected to the first tab body; the first resilient absorbing portion adapted to resist the loading panel to be deformed to prevent movement of the loading panel in a first direction parallel to the bottom panel and a second direction perpendicular to the bottom panel when the loading panel moves to a first side of the sliding slot in the first direction.

11. The scanner of claim 10, wherein the base further comprises a second resisting tab extending from the bottom panel; the second resisting tab comprises a second tab body extending from the bottom panel and a second resilient absorbing portion connected to the second tab body, the second tab body is adapted to resist the loading panel to be deformed to prevent movement of the loading panel in a third direction opposite to the first direction and the second direction when the loading panel moves to a second side of the sliding slot opposite to the first side in the third direction.

12. The scanner of claim 11, wherein the sliding slot defining a longer side surface and a first shorter side surface extending from the longer side surface, a plurality of first teeth slots defined in the longer side surface and a plurality of second teeth slots defined in the first shorter side surface; the driving module comprises a worm gear assembly engaging the first teeth slots and capable of moving along the longer side surface; and the worm gear assembly adapted to engage the plurality of second teeth slots to prevent the scanning module from moving when the scanning module moves to the first side along the longer side surface in the first direction.

13. The scanner of claim 12, wherein the scanning module further comprises an assistant gear; the sliding slot further defines a second shorter side surface extending from the longer side surface, a plurality of third teeth slots defined in the second shorter side surface; and the assistant gear is adapted to engage the plurality of third teeth slots to prevent the scanning module from moving when the scanning module moves to the second side along the longer side surface in the third direction.

14. The scanner of claim 13, wherein the second shorter side surface is substantially perpendicular to the longer side surface.

15. The scanner of claim 12, wherein the first shorter side surface is substantially perpendicular to the longer side surface.

16. The scanner of claim 15, wherein the scanning module further comprises a chain wheel mounted on the loading panel; the sliding portion includes an outer side surface; and the chain wheel is rotated to move along the outer side surface when the scanning module moves.

17. The scanner of claim 11, wherein the loading panel comprises a first side surface and the first resisting tab is adapted to resist the first side surface when the scanning module moves to the first side of the sliding slot in the first direction.

18. The scanner of claim 17, wherein the loading panel comprises a second side surface substantially parallel to the first side surface and the second resisting tab is adapted to resist the second side surface when the scanning module moves to the second side of the sliding slot in the third direction.

* * * * *